Dec. 5, 1933.    L. J. PEARSON    1,937,714
BATTERY CONSTRUCTION
Filed Jan. 31, 1930    2 Sheets-Sheet 1

Inventor:
Lawrence J. Pearson.
by his Attorneys
Howson & Howson

Dec. 5, 1933.  L. J. PEARSON  1,937,714
BATTERY CONSTRUCTION
Filed Jan. 31, 1930   2 Sheets-Sheet 2
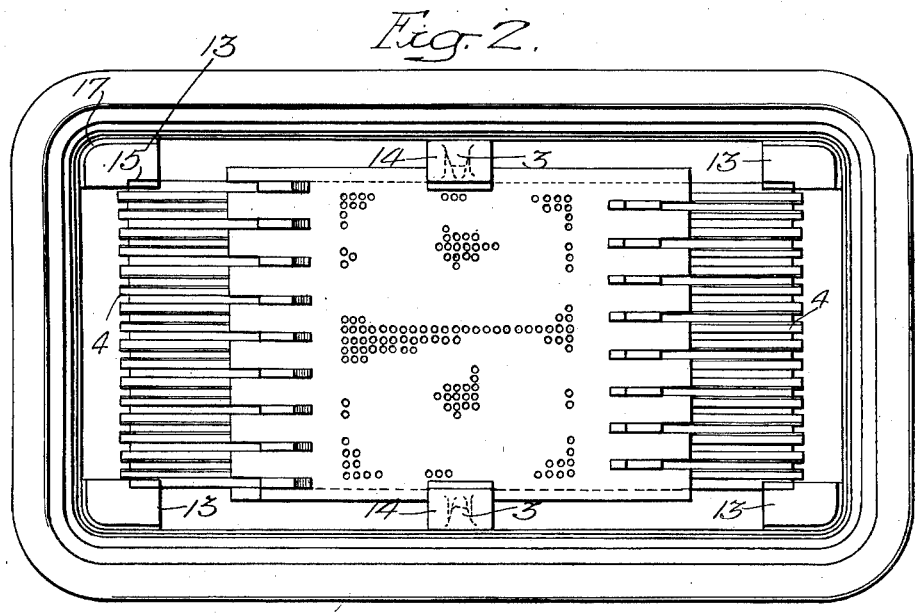
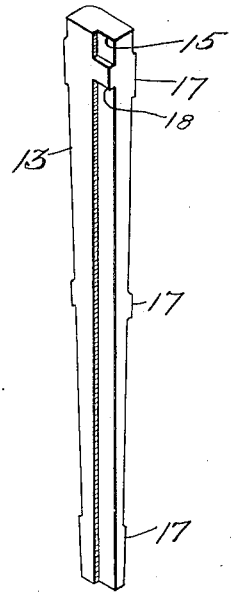
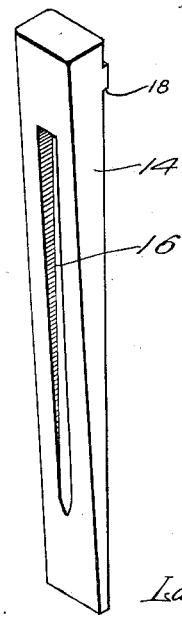
Inventor:-
Lawrence J Pearson
by his Attorneys
Howson & Howson Patented Dec. 5, 1933

1,937,714

UNITED STATES PATENT OFFICE 1,937,714

BATTERY CONSTRUCTION

Lawrence J. Pearson, Wyncote, Pa., assignor to Philadelphia Storage Battery Company, Philadelphia, Pa., a corporation of Pennsylvania Application January 31, 1930. Serial No. 425,032

5 Claims. (Cl. 136—81)

This invention relates to improvements in storage batteries, and the principal object of the invention is to provide novel, simple and effective means for obtaining a snug and secure assembly of the battery elements in the container.

More particularly, the invention has for an object the provision of such means applicable to batteries employing containers of glass, although the invention is applicable to storage batteries in general regardless of the materials of which the containers may be made.

Another object of this invention is to provide improved means for preventing distortion of the plates due to warping.

In the attached drawings:

Fig. 2 is a plan view of the battery with certain parts removed in order to clarify the illustration, and Figs. 3 and 4 are views in perspective of two of the elements which are employed in the practice of my invention.

Figure 1:
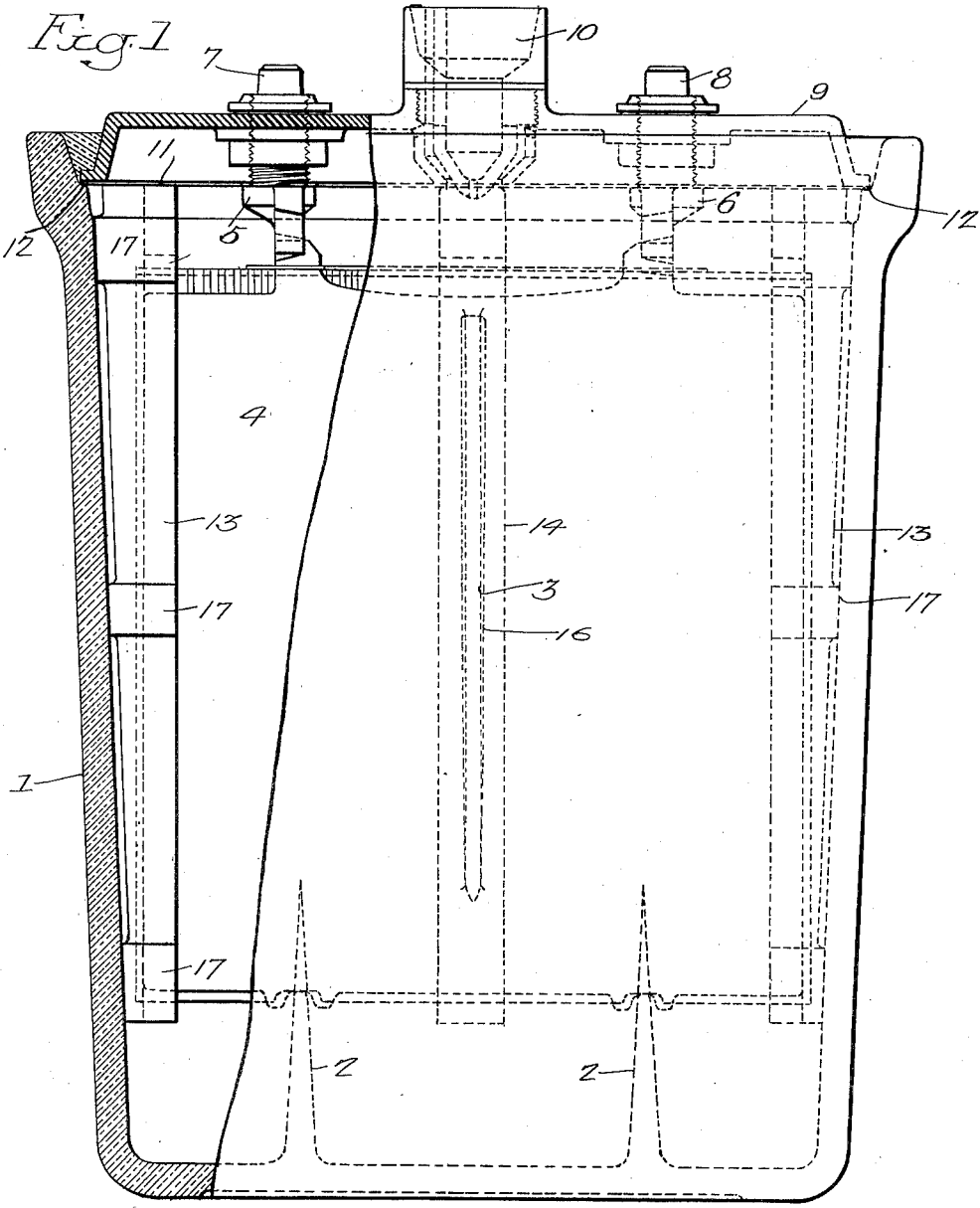
Figure 1 is a side elevation and partial sectional view of a battery incorporating my invention.

With reference to the drawings, 1 is a battery jar or container of glass or other suitable material, the inner walls of this container defining a cavity or receptacle of substantially right-angled parallelopiped form with its side walls tapering slightly towards the bottom in accordance with the requirements of the molding operation by which containers of this class are customarily formed. In the bottom of the container and extending from side to side thereof, I preferably provide one or more upstanding webs, 2, which constitute a support for the battery elements, as illustrated in Fig. 1; and preferably also the interior upright corners of the receptacle are smoothly rounded. In some instances, and particularly where the battery jars are of relatively large dimensions, I provide elongated upright projections or flanges 3 on the inner sides of the longer walls of the receptacle, the purpose of these elements being described hereinafter.

The battery elements, including the positive and negative plates and their separators, constitute an assembly or unit of substantially right-angled parallelopiped form, which assembly or unit is designated generally by the reference numeral 4, and, when placed within the container 1, is supported at the bottom upon the elements 2 and at the top through the medium of the straps 5 and 6 which respectively connect the plates of opposite polarity and to which are connected the terminal posts 7 and 8 which project upwardly through and are secured in the battery cover 9. The relative shape and size of the battery element assembly with respect to the interior of the battery jar or container are such that the assembly, when properly centered within the jar or container, has its walls disposed in substantially parallel, spaced relation from the inner walls of the jar or container to permit free circulation of the electrolyte within the cell and over and around the active plate material therein. The cover 9 comprises the usual vent and filler opening 10, and in some instances a perforated plate 11 is inserted intermediate the cover and the tops of the battery elements 4 thereby protect the elements, this plate 11 being supported in the present instance upon the shoulders 12 which also support the cover 9.

In accordance with the present invention I provide the members 13 and 14 shown respectively in Figs. 3 and 4. Each of the members 13 is formed at two sides to conform to the interior rounded corners of the jar, and in an opposite face is provided with a longitudinal recess 15 which in assembly is adapted to receive a vertical corner of the battery element assembly or unit 4. As well illustrated in Fig. 3, the members 13 are tapered towards the bottom in conformity with the interiorly tapered form of the container 1 whereby in assembly the inner or recessed surfaces of the members are substantially parallel to each other and are accurately fitted to the vertical edges of the substantially right-angled parallelopiped battery element assembly or unit 4. Where the container or the battery element assembly is of a form other than that of a right-angled parallelopiped the members 13 and 14 are shaped accordingly so that they fit neatly between the corners or sides of the container and the edges of the said unit. As illustrated, four of the members 13 are provided, in the present instance, one embracing each of the four vertical corners of the battery element assembly, whereby in assembly the battery element unit is confined at all corners and is substantially centrally spaced from the walls of the battery jar, it being noted that if the wedges are relatively narrow and are positioned at the corners where they engage only a slight portion of the active surface of the terminal plates, these wedges 13 offer no interference to the circulation of the electrolyte in the cell and over the active plate material therein, thus leaving substantially all of the faces of the assembly unobstructed for maximum contact with the electrolyte.

Where the battery is of considerable size, the members 14 shown in Fig. 4 may be used. These members are tapered in accordance with the taper of the side walls of the container and are provided in one face with a longitudinal recess 16 for reception of the flanges 3 of this container which thereby locate the members. The dimensions of the members 14 are such that in assembly and as shown in Fig. 2, the battery element unit 4 is neatly confined therebetween. It will be apparent that in assembly the members 14 are retained in their proper positions by the flanges 3 of the battery jar.

In assembling a battery made in accordance with my invention, the battery element unit 4 may first be inserted in the usual manner. Thereafter, the corner spacer members 13 may be inserted together with the members 14. The members 13 engage the corners of the battery jar and function as wedges and by reaction with the container walls to snugly bind and hold the battery element unit at the vertical corners thereof, the long sides of the unit being similarly confined between the members 14. It will be apparent that there is contact between the members 13 and 14 and the element assembly 4 throughout a substantial part or all of the height of the latter. Preferably, the members 13 are formed with projections 17 on their outer or jar-contacting faces to afford an intermediate space for free circulation of the electrolyte in the jar; and both the members 13 and 14 are preferably provided near their tops with shoulders 18 which contact with the upper edges of the plate assembly and prevent downward movement of the members in container beyond a predetermined point.

The members 13 and 14 may be made of any suitable electrically inert material, such as wood, bakelite or rubber composition.

By the foregoing invention, the element assembly 4 is snugly secured within the battery container and the element substantially immobilized with respect thereto, displacement, by reason of swelling or warping or from other causes being effectively prevented.

I claim:

1. In a storage battery, the combination with an assembly of positive and negative battery plates and separators therefor, of a container the interior of which conforms substantially with the shape and size of the assembly, means for supporting said assembly in the container, and means for centering and immobilizing the assembly in the container and for preventing relative displacement of the said plates and separators, said centering and immobilizing means comprising a plurality of narrow elongated wedge members suspended from the said assembly and respectively embracing the corners of said assembly over the entire depth of the latter and leaving substantially all of the faces of the assembly unobstructed for maximum contact with the electrolyte, said members being reactive with the corresponding corners of the container.

2. In a storage battery, the combination with an assembly of positive and negative battery plates and separators therefor, of a container the interior of which conforms substantially with the shape and size of the assembly, means for supporting said assembly in the container, and means for centering and immobilizing the assembly in the container and for preventing relative displacement of the said plates and separators, said centering and immobilizing means comprising a plurality of longitudinally tapered wedge members each having in its inner face a longitudinal recess for reception of a corner of said assembly and conforming at its outer surfaces to the corresponding corner of the container, one of said wedge members embracing each of the vertical corners of the assembly and leaving substantially all of the faces of the assembly unobstructed for maximum contact with the electrolyte.

3. In a storage battery, the combination with an assembly of positive and negative battery plates and separator therefor, of a container the interior of which conforms substantially with the shape and size of the assembly, means for supporting said assembly in the container, and means for centering and immobilizing the assembly in the container and for preventing relative displacement of the said plates and separators, said centering and immobilizing means comprising a plurality of longitudinally tapered wedge members each having in its inner face a longitudinal recess for reception of a corner of said assembly and conforming at its outer surfaces to the corresponding corner of the container, and a shoulder adjacent the top of each of said members terminating the said inner recess and bearing upon the top of said assembly, one of said wedge members embracing each of the vertical corners of the assembly and leaving substantially all of the faces of the assembly unobstructed for maximum contact with the electrolyte.

4. In a storage battery, the combination with an assembly of positive and negative battery elements, of a container, means for supporting said assembly in the container, and means for immobilizing the assembly in the container and for preventing relative displacement of the said elements, said immobilizing means comprising a wedge member inserted between the container and the said assembly, a recess in a face of said member, and a projection on the inner wall of the container and adapted to occupy said recess.

5. In a storage battery, the combination with an assembly of positive and negative battery plates and separators therefor, of a container the interior of which conforms substantially with the shape and size of the assembly, means for supporting said assembly in the container, and means for centering and immobilizing the assembly in the container and for preventing relative displacement of the said plates and separators, said centering and immobilizing means comprising a plurality of narrow elongated wedge members each engaging a corner of said assembly and two adjoining walls of the container, and leaving substantially all of the faces of the assembly unobstructed for maximum contact with the electrolyte.

LAWRENCE J. PEARSON.